United States Patent
Hediger (10) Patent No.: US 12,023,772 B2
(45) Date of Patent: Jul. 2, 2024

(54) ARRANGEMENT FOR PROCESSING WORKPIECES

(71) Applicant: Erowa AG, Reinach (CH)

(72) Inventor: Hans Hediger, Reinach (CH)

(73) Assignee: Erowa AG, Reinach (CH)

( * ) Notice: Subject to any disclaimer, the term of this patent is extended or adjusted under 35 U.S.C. 154(b) by 0 days.

(21) Appl. No.: 16/812,902

(22) Filed: Mar. 9, 2020

(65) Prior Publication Data
US 2020/0306903 A1 Oct. 1, 2020

(30) Foreign Application Priority Data
Mar. 25, 2019 (CH) .................... 00383/19

(51) Int. Cl.
*B23Q 3/155* (2006.01)
*B25J 5/00* (2006.01)

(52) U.S. Cl.
CPC ........ *B23Q 3/15539* (2016.11); *B23Q 3/1554* (2013.01); *B23Q 2003/155404* (2016.11);
(Continued)

(58) Field of Classification Search
CPC .. Y10S 901/01; Y10S 901/41; Y10T 483/175; Y10T 483/1779; Y10T 483/1783; Y10T 483/1786; Y10T 483/1788; Y10T 483/1845; Y10T 483/1855; Y10T 483/12; B23Q 3/15539; B23Q 3/15573; B23Q 2003/15537; B23Q 2003/155404;
(Continued)

(56) References Cited

U.S. PATENT DOCUMENTS

| 4,543,636 A | * | 9/1985 | Noda ............... G05B 19/41825 483/58 |
| 8,280,547 B2 | * | 10/2012 | D'Andrea ............ G05D 1/0234 700/214 |

(Continued)

FOREIGN PATENT DOCUMENTS

| CN | 106826784 A | 6/2017 |
| CN | 106975957 A | 7/2017 |

(Continued)

OTHER PUBLICATIONS

EPO Machine Translation of CN109333130A—"Device for automatically changing cutting tool by using AGV, has cutting tool comprising AGV, positioning module and changing module, where positioning module and changing module are arranged on AGV and changing module comprises knife rest", Feb. 15, 2019.*

(Continued)

*Primary Examiner* — Erica E Cadugan
*Assistant Examiner* — Michael Vitale
(74) *Attorney, Agent, or Firm* — Maginot, Moore & Beck LLP (57) ABSTRACT

An arrangement for processing workpieces includes at least one processing machine, a machine magazine assigned to a respective processing machine for accommodating processing tools, and a robot arranged on a driverless base frame. Processing tools may be supplied to and/or removed again from the machine magazine using the driverless base frame. The driverless base frame is additionally provided with a temporary magazine for accommodating processing tools.

15 Claims, 2 Drawing Sheets

(52) U.S. Cl.
CPC ....... *B25J 5/00* (2013.01); *G05B 2219/31266* (2013.01); *Y10S 901/01* (2013.01); *Y10T 483/12* (2015.01); *Y10T 483/165* (2015.01); *Y10T 483/175* (2015.01); *Y10T 483/1855* (2015.01)

(58) Field of Classification Search
CPC ........ B23Q 3/1554; G05B 2219/50251; G05B 2219/50243; G05B 2219/31266–31271
USPC .......... 901/1, 41; 483/37, 49, 51, 52, 53, 63, 483/64, 4
See application file for complete search history.

(56) References Cited

U.S. PATENT DOCUMENTS

| | | | | |
|---|---|---|---|---|
| 2004/0158357 | A1* | 8/2004 | Lee | G05D 1/0227 |
| | | | | 700/258 |
| 2012/0143427 | A1* | 6/2012 | Hoffman | G05D 1/0274 |
| | | | | 701/23 |
| 2013/0011234 | A1* | 1/2013 | Pretlove | B25J 5/005 |
| | | | | 701/2 |
| 2013/0203572 | A1* | 8/2013 | Denkmeier | B23Q 11/0085 |
| | | | | 483/58 |
| 2014/0203764 | A1* | 7/2014 | Ireland | A47L 9/009 |
| | | | | 901/1 |
| 2016/0059411 | A1* | 3/2016 | Richter | B25J 9/1666 |
| | | | | 901/1 |
| 2017/0066592 | A1* | 3/2017 | Bastian, II | B25J 5/007 |
| 2017/0113352 | A1* | 4/2017 | Lutz | B25J 19/021 |
| 2018/0141211 | A1* | 5/2018 | Wellman | B25J 9/1612 |
| 2018/0250784 | A1* | 9/2018 | Kasahara | B23Q 3/15546 |
| 2018/0326623 | A1* | 11/2018 | Winzinger | B65C 9/0062 |
| 2019/0025847 | A1* | 1/2019 | Mannefred | A47L 9/2894 |

FOREIGN PATENT DOCUMENTS

| | | | | |
|---|---|---|---|---|
| CN | 108569528 | A * | 9/2018 | ............. B65G 35/00 |
| CN | 208013770 | U | 10/2018 | |
| CN | 109333130 | A | 2/2019 | |
| CN | 112720012 | A * | 4/2021 | |
| JP | 62-259738 | A * | 11/1987 | ......... B23Q 3/15539 |
| WO | 2016014917 | A1 | 1/2016 | |
| WO | WO-2019053900 | A1 * | 3/2019 | ............. B23H 11/00 |
| WO | WO-2019091674 | A1 * | 5/2019 | ............. B60L 53/14 |

OTHER PUBLICATIONS

EPO Machine Translation of WIPO Publication No. WO 2019053900 A1—Shirone, Masahiro; "Machine Tool System"; Mar. 21, 2019.*
Swiss Search Report corresponding to Swiss application No. 00383/19 dated Jul. 4, 2019 (3 pages).

* cited by examiner

ARRANGEMENT FOR PROCESSING WORKPIECES

PRIORITY CLAIM

This application claims priority to Swiss Application No. 00383/19, entitled "ARRANGEMENT FOR PROCESSING WORKPIECES", filed in the name of the same inventor and applicant on Mar. 25, 2019, the entire disclosure of which is incorporated herein by reference.

TECHNICAL AREA

The invention relates to an arrangement for processing workpieces, a driverless base frame for such an arrangement, and a method for controlling the arrangement.

PRIOR ART

In order that a processing machine, for example a milling machine, integrated in a generic arrangement, may differently process different workpieces, the milling machine must be able to access different processing tools/milling tools (milling cutters). A tool magazine is generally assigned to the respective milling machine and is equipped with different milling tools. Modern CNC milling machines have hydraulic tool clamping systems, with which an automated change of the milling tools is enabled. Until now, the processing tools are supplied to or removed from the magazine assigned to the respective processing machine either manually or via a portal system. Both variants have disadvantages. The manual supply/removal of processing tools to/from the respective processing machine requires manpower and is correspondingly complex and expensive. As such processing machines are also to be operated unmanned, and often in multiple shifts, the assigned tool magazine may be too small for the necessary processing operations. However, during the unmanned shifts, demands corresponding to a few tool changes or multiple tool changes up to many tool changes should also be possible. An automated tool loading of the tool magazine may also be useful, even without automation, in order to relieve the operator or to prevent misequipment.

On the other hand, however, a portal system, which basically enables an automated tool change, is linked to disadvantages, because it is expensive and inflexible, and additionally requires a lot of space.

WO 201614917 A1 discloses an inventory system for storing and retrieving from bins. The inventory system has, in addition to a main computer 200, a mobile stocker device 100 in the form of an AGV with a robot 120 arranged thereupon. The AGV comprises a battery 190 for power supply of the drive and also of the robot. In addition, a temporary magazine in the form of a bin 145 is arranged on the AGV. The AGV is provided with at least one sensor 110, 150, by means of which it may orient and position itself within the inventory system on the basis of markings. Another sensor is to function for recognizing, identifying, and localizing goods to be stored or retrieved.

Figure 1:
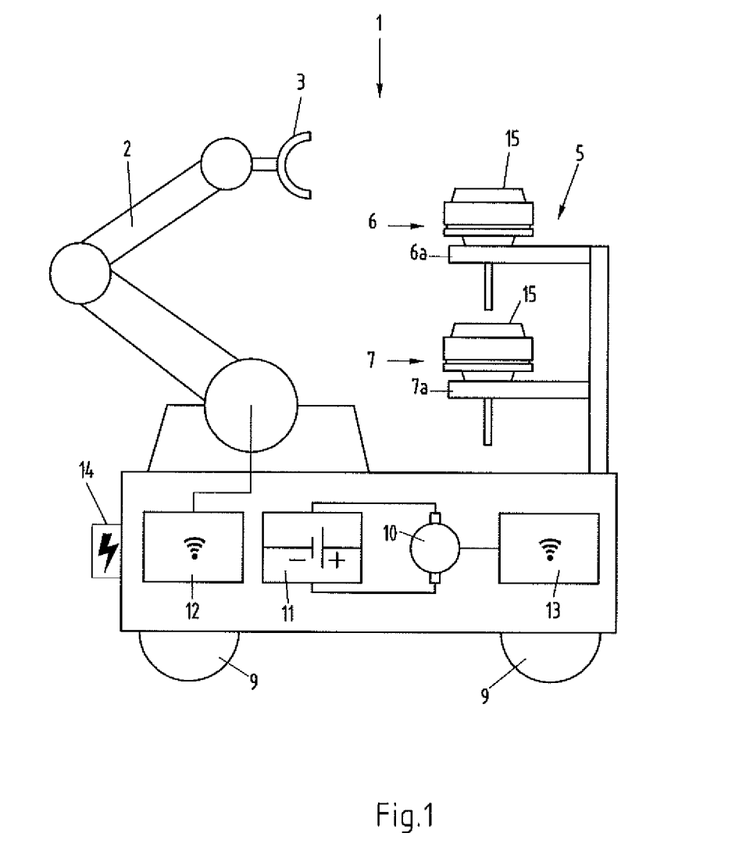
FIG. 1 shows a schematic depiction of a driverless base frame with a robot arranged thereon.
Figure 2:
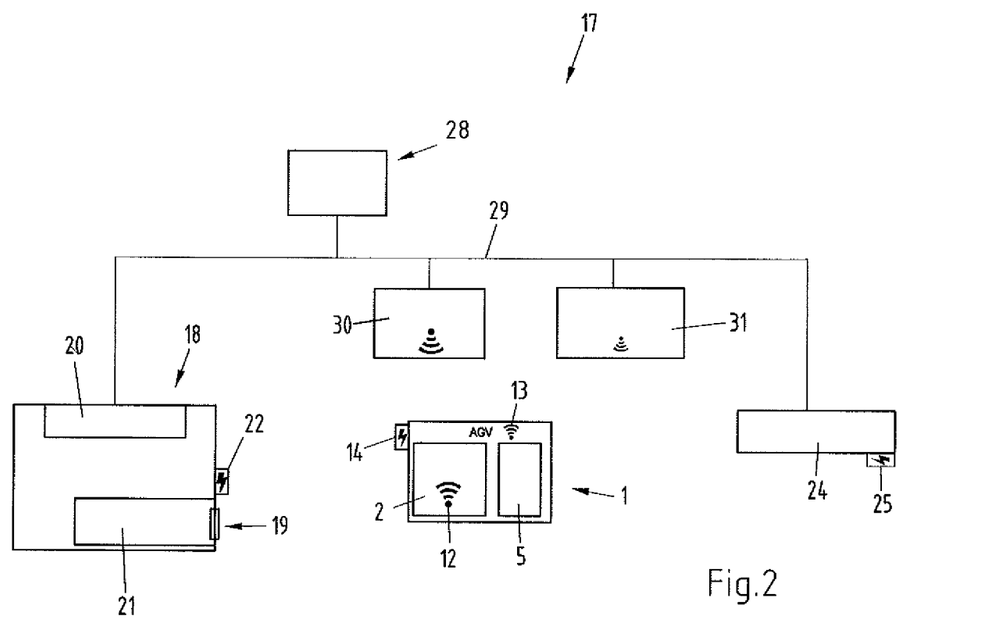
FIG. 2 shows, in a schematic depiction, an arrangement, equipped according to the invention, which comprises a driverless base frame designed according to FIG. 1.

A tool transport system is known from CN208013770U, which comprises, according to FIG. 1, a numerically controlled tool machine 1, two stationarily-arranged 6-axis robots 2, one loading station 3, a loading and unloading station 4 for tools, a main control unit 5, and a ring-shaped guide line 6. FIG. 2 shows a two-dimensional data collector 7, a two-dimensional code display 8, a tool carrier 9, and AGV tool carriage 10, and a mounting bracket 11.

Finally, CN106826784A discloses a driverless base frame which is provided with a pneumatic gripper.

The object of the invention is to create an arrangement for processing workpieces belonging to the technical area mentioned at the outset, which enables a fully automated supply of processing tools to a magazine assigned to the respective processing machine and/or a fully automated removal from a magazine assigned to the respective processing machine, wherein the arrangement is flexible and universally usable.

The solution to the problem is defined by the features of the present invention. According to the invention, the arrangement comprises at least one processing machine and a machine magazine, assigned to the respective processing machine, for accommodating processing tools, and a robot arranged on a driverless base frame by means of which processing tools may be supplied to the machine magazine and/or may be removed from the same, wherein the arrangement additionally comprises a central tool magazine for processing tools, which is arranged in such a way that the robot of the driverless base frame may remove and/or transfer processing tools from/to the same, and that the driverless base frame is provided with a temporary magazine for accommodating processing tools.

By providing a central tool magazine, a tool inventory is created, from which the robot of the driverless base frame may fully automatically remove processing tools and also to which it may transfer them again, which is advantageous with respect to a fully automated operation of the system, given that a central tool magazine may accommodate a large number of different processing tools, so that the travel paths to be travelled by the driverless base frame may be optimized or minimized, and addition, the time necessary for a tool change may be reduced. In addition, new machines may be simply added and the processing tools may be used on different processing machines. No problems arise with regard to space required, in particular with respect to necessary clearance heights. In addition, a tool change may be carried out at the processing machine without manual intervention, which brings advantages, in particular during shift operation.

In one particularly preferred refinement, the temporary magazine of the driverless base frame is designed for accommodating at least three processing tools, in particular for accommodating at least ten processing tools, wherein the temporary magazine is designed in such a way that the respective processing tool may be accommodated in a positionally defined way.

The provision of a temporary magazine for at least three processing tools enables, for example, that two different processing tools are available and that one space remains free, so that, for example, a processing tool may be removed from a machine or from the machine magazine without having to transfer a processing tool to the machine. It is understood that the flexibility is also basically increased with a larger temporary magazine. In addition, such a temporary magazine enables that, during the traveling around of the driverless base frame, no tool needs to be held by means of the robotic gripper, so that the risk is reduced of losing or dropping tools during the movement of the base frame.

The temporary magazine preferably comprises multiple levels, arranged vertically above each other, for accommodating processing tools, wherein horizontally extending strips are arranged in each level which are provided with mechanically designed positioning aids for the processing tools. Horizontally extending strips represent a simple possibility for dividing the temporary magazine at multiple levels, which is advantageous with respect to the size of the magazine and the spatial requirements, wherein the mechanical positioning aids help to place the respective processing tool in the temporary magazine in a positionally defined way. In addition, the mechanical positioning aids ensure that the respective processing tool retains its position and alignment in the temporary magazine during the movement of the driverless base frame.

In one particularly preferred refinement, the driverless base frame is provided with an electromechanical interface, by means of which it is dockable at a docking point in such a way that it is positioned and/or supplied with power. An electromechanical interface enables both a positionally precise docking of the driverless base frame and also an electric coupling for the power supply of electric components.

The driverless base frame is preferably electrically driven and provided with at least one accumulator for power supply of the drive and/or or the robot, wherein the accumulator is chargeable at the docking point. A platform designed in this way is comparatively simple to construct and inexpensive to manufacture.

The processing machine and/or the central tool magazine is/are particularly preferably provided with a docking point. The provision of a docking point at the respective machine or device facilitates, for example, that the accumulator is charged during the transfer or removal of a tool. If the robot is not supplied by an accumulator arranged on the driverless base frame, then said robot may be supplied with electrical power via the docking point.

The arrangement preferably has means, with the aid of which the actual position of the driverless base frame and/or of the robot may be detected with respect to the processing machine and/or the central tool magazine after the docking of the driverless base frame. By this means, the driverless base frame does not need to be positioned very precisely for the transfer or removal of a tool in relation to the respective machine or device, but instead it may suffice, for example, to position the driverless base frame with an accuracy of approximately ±10 mm to ±30 mm to the processing machine or to the central tool magazine. Afterwards, the robot calibrates the accuracy necessary for a transfer or removal of a tool with respect to the machine or device.

The robot arranged on the driverless base frame is preferably electrically driven, wherein the robot is supplied by an accumulator arranged on the driverless base frame and/or is supplied with electrical power at a docking point. Electrically driven robots are available in the most varied of embodiments, such that the driverless base frame may be equipped with a suitable robot specific to the use.

The robot is preferably designed as at least a 4-axis robot, in particular at least a 6-axis robot. These types of robots are flexible in use and inexpensive to procure.

The robot particularly preferably has a pneumatically-driven gripper, wherein the driverless base frame is provided with a compressed air reservoir for actuating the gripper or the driverless base frame is connected to a compressed air source for actuating the gripper upon docking at a docking point. Pneumatically-driven grippers have been established as the standard for many applications, as they are available in the most varied of variants. If the tools may be accommodated in the temporary magazine during transport, then the gripper does not have to be supplied with compressed air during movement of the driverless base frame.

Another, preferred refinement of the arrangement provides that the machine magazine of the processing machine is provided with a sealable loading opening, via which the robot may supply and/or remove processing tools to/from the processing machine. A sealable loading opening may prevent that cooling water and shavings, for example, emerge during the processing of workpieces.

A sealable loading opening may additionally be controlled in such a way that the opening and closing may be triggered by the robot or may be carried out automatically by the docking or coupling of the driverless base frame.

The arrangement preferably has a control system for controlling the driverless base frame and also the robot, wherein both the driverless base frame and also the robot are wirelessly controllable via the control system. Both devices may thus be individually controlled and a particularly flexible use is facilitated of the driverless base frame together with the robot.

Another object of the invention consists in creating a driverless base frame for an arrangement, which is flexible in use and is suited in a particularly preferred way for an efficient and fully automated tool loading of processing machines.

This problem is solved by a driverless base frame, which is provided with a temporary magazine for accommodating tools, wherein a robot is arranged on the base frame, by means of which robot tools may be supplied to and/or removed from the temporary magazine. By providing a temporary magazine of this type, the number of trips and also the travel paths to be traveled by the driverless base frame may be optimized or minimized. As the tools may be placed in the temporary magazine during movement of the driverless base frame, the risk is averted that tools held in the gripper may drop.

One particularly preferred refinement of the driverless base frame is that the driverless base frame is electrically driven and is provided with an accumulator to supply the drive and/or the robot, wherein the driverless base frame may operate non-track-bound.

This embodiment facilitates a particularly flexible use of the driverless base frame. In addition, conventional rails in the sense of mechanical guide means do not have to be provided, but instead the driverless base frame may follow, for example, an optical or inductive track, which is advantageous in particular with respect to a potential expansion/change and also in relation to the costs and the needed space. In addition, the application area of the driverless base frame may be simply and quickly adjusted to changing circumstances, if, for example, an additional processing machine is to be thus equipped.

One particularly advantageous embodiment of the driverless base frame provides that this is provided with separate receivers for the electric drive and the robot. By providing two independent receivers, the two devices—the driverless base frame and the robot—may be individually controlled. In addition, the logistical expense of two independent receivers is comparatively minor, in particular, in comparison with only one receiver, which must interpret received commands and assign them to a respective device.

Finally, another object of the invention consists in disclosing a method for controlling an arrangement for processing workpieces which facilitates a particular efficient equipping of processing machines with processing tools.

According to the invention, the solution to this problem consists in that tools are supplied to the processing machine by means of the robot arranged on the driverless base frame, wherein the tools are removed from a central tool magazine by means of the robot, then temporarily stored afterwards on the driverless base frame, and subsequently transferred to the processing machine. This method, together with the driverless base frame, is suitable for fully automated equipping of one or more machine magazines of processing machines.

In a particularly preferred method for controlling the arrangement the driverless base frame is moved by means of a control system to the processing machine and prepositioned there, for the transfer or removal of a tool, wherein the driverless base frame is then either mechanically finely positioned or the deviation is determined between the actual and a target position and is taken into consideration by calculation during the transfer or removal of tools. Both variants enable precisely aligning and moving the robot with respect to the processing machine in such a way that a transfer or removal of processing tools from a defined position or to a defined position is facilitated by means of the robotic gripper.

Additional advantageous embodiments and combinations of features of the invention arise from the subsequent detailed description and the totality of the patent claims.

BRIEF DESCRIPTION OF THE DRAWING

The invention is subsequently described in greater detail by way of the drawing.

Identical parts are basically provided with identical reference numerals in the figures.

DETAILED DESCRIPTION OF THE INVENTION

FIG. 1 shows a driverless base frame 1 in a schematic depiction, which is also designated in technical jargon in particular as an AGV (automated guided vehicle). A robot 2 is arranged together with a shelf functioning as temporary magazine 5 on said base frame 1. Temporary magazine 5 is designed in the present example as a tool magazine for accommodating processing tools 15. Depending on the application, temporary magazine 5 may be designed to accommodate a few tools up to multiple dozen tools. In the present depiction, temporary magazine 5 has two levels 6, 7 arranged vertically above one another, wherein multiple processing tools 15 may be accommodated in each level 6, 7. Temporary magazine 5 is designed in such a way that respective processing tool 15 may be placed therein in a positionally defined way. Temporary magazine 5 is thus preferably provided with elevations and/or depressions and/or holes and/or slots and/or recesses (none of them being depicted), which function as mechanical positioning aids during the placement and/or removal of processing tools 15 into temporary magazine 5. Horizontally extending strips 6a, 7a are arranged in each level 6, 7. The listed mechanical positioning aids may be applied in said strips 6a, 7a or on said strips 6a, 7a. Although only two levels 6, 7 and two strips 6a, 7a are depicted in the present example, naturally significantly more levels may be provided with a corresponding number of strips. Thus, for example, three, four, five, or six levels may be provided, wherein three to ten processing tools may be accommodated in each level, so that a total of between 9 and 60 tools may be accommodated in temporary magazine 5. Driverless base frame 1 has four wheels 9 and a drive 10, which is supplied by an accumulator 11. In addition, driverless base frame 1 is provided with two electronic devices 12, 13, which each comprise, in particular, a transmitting and receiving device and a control device. Both electronic devices 12, 13 are preferably also supplied with power from accumulator 11. For reasons of simplicity, electronic devices 12, 13 are subsequently partially also designated as receivers 12, 13. First electronic device 12 functions for controlling robot 2, while second electronic device 13 functions for controlling drive 10. By providing two independent receivers 12, 13, the two devices—driverless base frame 1 and robot 2—may be individually controlled. In addition, the logistical expense of two independent receivers 12, 13 is comparatively minor, in particular, in comparison with only one receiver, which must interpret received commands and assign them to a respective device.

Driverless base frame 1 additionally has an electromechanical interface 14, which in turn is indicated only schematically, and by means of which driverless base frame 1 may be docked at a docking point. Electromechanical interface 14 ensures on the one hand that driverless base frame 1 is positioned at the docking point during docking, and on the other hand is supplied with power, as will be subsequently explained in greater detail.

Robot 2, depicted arranged on the driverless base frame and likewise strongly simplified, has at least 4, in particular at least 6 movement axes. The movement axes of robot 2 are driven by an electric motor, while a gripper 3, functioning for grasping/holding of processing tools 15, is pneumatically actuated, wherein naturally a gripper actuated by an electromotor may also be used. The supply of robot 2 in the present example is not carried out via accumulator 11 of driverless base frame 1, but instead via electromechanical interface 14. Robot 2 may be externally supplied via said electromechanical interface 14 in the docked state, as will subsequently be explained again. Cited processing tools 15 may be transferred to or removed from a processing machine by robot 2, as will subsequently likewise be explained in greater detail.

FIG. 2 shows an arrangement 17 configured according to the invention in schematic depiction. Arrangement 17 comprises, in addition to previously mentioned driverless base frame 1, a processing machine 18, a central tool magazine 24, and a control system 28. Control system 28 is connected into a network together with processing machine 18, driverless base frame 1, and central tool magazine 24, wherein processing machine 18 and tool magazine 24 are cable-connected, while driverless base frame 1 and also robot 2 are integrated by means of a wireless data transmission-interface. Control system 28 preferably comprises two wireless transmitting and receiving units 30, 31. First transmitting and receiving unit 30 functions for controlling driverless base frame 1, while second transmitting and receiving unit 31 functions for controlling robot 2. A respectively independent control of driverless base frame 1 and robot 2 provides advantages in relation to programming and complexity or simplicity of the system. To simplify and to delimit with respect to receivers 12, 13, arranged on driverless base frame 1, transmitting and receiving units 30, 31 of control system 28 are subsequently also designated as transmitters 30, 31.

Processing machine 18 has an electronic controller 20, which is schematically depicted in the form of a block. In addition, processing machine 18 is provided with a tool magazine, subsequently listed in particular as machine magazine 21. Machine magazine 21 may be integrated into machine 18 or assigned to machine 18. Processing machine 18 has a tool clamping system, by means of which an automated change of the processing tools is facilitated, in that processing tools may be removed by this from machine magazine 21 and may also be delivered again to the same.

Furthermore, arrangement 17 comprises central tool magazine 24, which may be equipped with a plurality of processing tools. Such a tool magazine 24 may, for example, accommodate between approximately 30 and 300 processing tools. By means of driverless base frame 1, processing tools may be exchanged between central tool magazine 24 and processing machine 18 or machine magazine 21. In each case, robot 2 arranged on driverless base frame 1 may, on the one hand, remove processing tools from central tool magazine 24 and supply them to processing machine 18 or to its machine magazine 21, and, on the other hand, robot 2 may remove processing tools from processing machine 18 or its machine magazine 21 and supply them to central tool magazine 24. Because driverless base frame 1 has a temporary magazine 5, a certain number of processing tools may be temporarily stored on base frame 1. The processing tools are preferably placed in temporary magazine 5 during transport, thus during the movement of driverless base frame 1. This has the advantage, on the one hand, that robot 2 or its gripper 3 does not have to actively hold any processing tools during transport, which might be a problem, in particular, for pneumatic grippers. In addition, the number of trips of driverless base frame 1 may be optimized or reduced, because a certain number of processing tools may be accommodated in temporary magazine 5. Therefore, driverless base frame 1 does not have to fetch the desired processing tool from central tool magazine 24 for each tool change, and also a tool, removed from processing machine 18, does not have to be supplied to central tool magazine 24 each time. Intelligent logic may be used to control which tools are to be temporarily stored in temporary magazine 5 of driverless base frame 1 and which are not, wherein preferably at least one storage space always remains empty in temporary magazine 5, so that a tool removed from processing machine 18 may be accommodated therein. Preferably, multiple storage spaces remain free, so that optionally multiple processing tools may be removed from machine magazine 21 without these having to be urgently transferred to central tool magazine 24 or that new processing tools must be transferred to the machine in exchange. The management of the processing tools accommodated in driverless base frame 1 is preferably carried out using a defined space assignment.

The term "central" with respect to the tool magazine is to be understood in such a way that the tool magazine is easily accessible to driverless base frame 1, and the travel paths to be traveled are optimized to the greatest extent, so that central is not to be equated with placed in the center, but instead meaning easily or readily accessible.

Both driverless base frame 1 and also processing machine 18 and central tool magazine 24 are each provided with an electromechanical interface 14, 22, 26, wherein electromechanical interface 14 of driverless base frame 1 is compatible with those of processing machine 18 and central tool magazine 24 in such a way that driverless base frame 1 may be thereby docked both at processing machine 18 and also at central tool magazine 24. The listed interfaces at processing machine 18 and central tool magazine 24 thus function as docking points 22, 25 for docking driverless base frame 1. The latter may, on the one hand, be positioned by docking at respective docking point 22, 25, i.e., aligned in relation to processing machine 18 or to central tool magazine 24. On the other hand, driverless base frame 1, like robot 2, supplied with power at respective docking point 22, 25. In the present example, accumulator 11 (FIG. 1) of driverless base frame 1 is charged in the docked state, while robot 2 is directly connected to the power supply and is thereby supplied with electrical power. In addition, robot 2 or its pneumatically-driven gripper 3 is supplied with compressed air via the docking point, in that interface 14 of driverless base frame 1 is pneumatically connected to a pressure source. Respective docking point 22, 25 is preferably connected to the electrical network and to a compressed air supply.

The functioning of the arrangement is subsequently explained in greater detail by way of an example, wherein reference is made to both figures. The tasks to be processed within a certain time interval are transmitted to control system 28. Based on priorities, deadlines, quantities, etc., control system 28, connected to processing machine 18 via the network, now checks which task is to be completed first. In addition, control system 28 detects the current inventory of processing tools, which are present/stored in machine magazine 21 and optionally in the chuck of processing machine 18. The tool inventory may be read out via the network from machine controller 20. Control system 28 now reads the next processing program(s) and extracts the necessary processing tools. Afterwards, it compares the necessary tools with those, which are already present in machine magazine 21. From this, a list of missing tools is created. Optionally, a list of not necessary tools is also generated.

Control system 28 now commands driverless base frame 1 to central tool magazine 24, where it docks at docking point 25. Afterwards, control system 28 commands robot 2, and optionally also central tool magazine 24, to transfer the necessary tools from central tool magazine 24 to temporary magazine 5 of driverless base frame 1. If unnecessary tools of processing machine 18 are to be removed, then a corresponding part of temporary magazine 5 remains free.

Afterwards, control system 28 commands driverless base frame 1 to processing machine 18, where it docks at docking point 22. Control system 28 issues processing machine 19 the task of transporting an unnecessary tool to loading opening 29. Processing machine 18 opens loading opening 19, wherein the opening may optionally be triggered by control system 28 or robot 2 or it may be carried out automatically after the docking of driverless base frame 1. Afterwards, control system 28 commands robot 2 to remove the unnecessary tool and place it on a free space of temporary magazine 5. Afterwards, robot 2 receives the command to load a necessary tool 15 from temporary magazine 5 into machine magazine 21 of processing machine 18. Control system 28 registers loaded/unloaded tool 15 correctly with machine controller 20, wherein in particular the tool type, its dimensions, zero point, etc. are recorded and stored. Processing machine 18 closes loading opening 19, which is triggered either by control system 28 or robot 2, or may be carried out automatically after the removal of a tool from machine magazine 21. This process is repeated until all necessary tools are loaded from temporary magazine 8 into machine magazine 21 of processing machine 18 and/or until all unnecessary tools are removed from machine magazine 21 and transferred into temporary magazine 5.

In order to unload driverless base frame 1, this is ordered by control system 28 to central tool magazine 24. There, robot 2 is directed to unload the no longer necessary tools 15 from temporary magazine 5 of driverless base frame 1 into central tool magazine 24. The previously described process may naturally also be only partially carried out (for example, if no tools are to be unloaded) or, however, carried out in parallel with multiple driverless base frames for one or more machines.

For example, a command may also take place from the control system to the driverless base frame in the form that it is communicated to the driverless base frame where it needs to travel and from which space a processing tool is to be removed or to which space a processing tool is to be transferred. The command to the driverless base frame may, for example, read as follows: drive to the processing machine, remove a tool there from space 3 in the temporary magazine and transfer this to space 1 in the machine magazine. This also naturally analogously applies for the case, that a tool needs to be removed from space x in the machine magazine or from space y in the central tool magazine and needs to be transferred to space z in the temporary magazine.

In order that driverless base frame 1 knows how and where it may and is permitted to move, it is taught and tuned to its use area. A survey of the surroundings is carried out by means of sensors—in particular surface scanners—mounted on the driverless base frame, wherein the sensors are not depicted. Driverless base frame 1 thereby travels the surroundings at least one manually, thereby records the same, and stores the necessary data internally or externally on control system 28. The navigation is then carried out using algorithms similar to artificial intelligence. Instead of surface scanners, so-called laser navigation may also be used. Retroreflecting marks—films—are applied to corresponding points, for example walls and columns, and may be precisely measured by a rotating laser scanner, even over larger distances. For a precise position determination, at least 3 of such marks must be visible to the laser scanner. A contour-based navigation or a navigation by means of magnetic points applied into the floor are, however, also quite possible.

In any case, conventional rails do not have to be provided for the driverless base frame in the sense of mechanical guide means. Instead of the previously discussed learning by means of sensors, for example, an optical or inductive track might also be provided, which the driverless base frame may follow. The omission of mechanical guide rails is advantageous, in particular with respect to potential expansions/changes of the arrangement and also in relation to the costs connected thereto and to the space necessary for the same.

The docking of driverless base frame 1 at docking point 22, 25 of processing machine 18 or of central magazine 24 may be carried out in different ways. In a first example, driverless base frame 1 positions itself with a conventional accuracy of approximately ±10 mm to ±30 mm at processing machine 18 or central tool magazine 24. Afterwards, the precise position of driverless base frame 1 or of robot 2 is determined with respect to machine 18 or of central tool magazine 24 on the bases of reference elements (not depicted) applied on machine 18 or tool magazine 24, which, for example, may be carried out by means of sensors arranged on base frame 1 and/or robot 2. The determined target-actual deviation may then be used to control robot 2. In another example, driverless base frame 1 positions itself again with the conventional accuracy of approximately ±10 mm to ±30 mm at respective docking point 22, 25.

Afterwards, driverless base frame 1 is retracted by means of a mechanical positioning system, for example, via an inlet and a chuck, and thereby positioned with the necessary accuracy of, for example, approximately ±3 mm in relation to machine 18 or to tool magazine 24.

In order to facilitate a power and signal transmission from stationary docking point 22, 25 to driverless base frame 1, the interface may comprise a plug coupling. Such a plug coupling may optionally also have a pneumatic connection.

A few advantages of the arrangement designed according to the invention are subsequently listed:

In contrast to permanently installed transfer systems, which are mostly arranged above the machines, processing machines may be arranged in almost any spatial order by providing a driverless, non-track-bound base frame;

New machines may be easily added by learning on the part of the driverless base frame;

The transport capacity may be variably increased by adding additional driverless base frames into the grouping or the arrangement;

There are no problems related to clearance heights;

Processing tools may be automatically used on different processing machines;

The provision of two independent transmitting and receiving units 30, 31 for controlling driverless base frame 1 or robot 2 facilitates a comparatively simple structure and a simple programming of the transmitter and receiver;

Instead of two independent transmitting and receiving units, only one transmitting and receiving unit may be provided, both on the side of the control system and also on the side of the driverless base frame. In this case, a controller/logic is present on the receiver side, which interprets the received commands and assigns them to the respective device—robot or driverless base frame.

Although previously the general term tool machines has been used, the most varied types of processing machines, for example, milling machines, grinding machines, drilling machines, or turning machines are understood under this term, wherein this list is not conclusive.

The previous embodiment is then also not to be considered to be exhaustive, but instead embodiments deviating therefrom are certainly possible in the scope of the invention. A few other variants are subsequently mentioned, in a non-exhaustive way:

The robot might also or exclusively be supplied with power via the accumulator of the base frame;

The control system might be arranged on the driverless base frame;

The robot might be provided with an electric gripper;

The driverless base frame might additionally be provided with an accommodation for workpieces. The workpieces might optionally be supplied to a processing machine and removed again therefrom by means of the robot;

The charging of the accumulator might take place inductively;

The accumulator arranged on the driverless base frame might be dimensioned in such a way that it may supply the driverless base frame and also the robot with power over many hours. In this case, docking points at the processing machine and/or at the central tool magazine might optionally be omitted, and a central charging station, which optionally functions inductively, might be provided. Such a solution is offered in particular if the gripper is also actuated by an electromotor, as in such a case a pneumatic coupling may also be omitted;

If the robot is provided with a pneumatic gripper, then a compressed air reservoir might also be provided on the driverless base frame. In order to fill the compressed air reservoir, a compressed air pump (compressor) supplied by means of the accumulator might additionally be provided on the driverless base frame;

A common transmitting and receiving unit might be provided for the driverless base frame and the robot;

Instead of managing the tools accommodated in the driverless base frame via a spatial assignment, a reader might be provided by means of which the respective tool is identified. The tools would have to be provided with an identification, for example, a chip or an optical mark, for this;

If the arrangement comprises multiple processing machines, then two or three driverless base frames might also be provided. It is understood that the control system must be adjusted in such a case. Optionally, more than one central tool magazine might be provided;

In order to align the robot in relation to the processing machine or to the central tool magazine, a means might be provided, instead of a fine positioning or mechanical coupling, which recognizes the position of the robot in relation to the processing machine or to the central tool magazine after the rough positioning of the driverless base frame. The robot controller may then compensate for the potential offset with respect to a defined target position;

Instead of a passive central tool magazine, this might also be designed as active, in that it has a handling device—robot—and is optionally also provided with a tool identification;

The opening of the loading opening is preferably triggered by the driverless base frame or the robot, in particular after the driverless base frame has positioned itself in front of the respective loading opening and the robot is ready for the transfer or removal of a tool;

Instead of one single accumulator, at least one additional accumulator might be provided on the driverless base frame, which would function, in particular, for supplying the two electronic devices 12, 13 arranged on the base frame.

The invention claimed is:

1. An arrangement for processing workpieces, with at least one processing machine and a machine magazine assigned to a corresponding one of the at least one processing machine for accommodating processing tools, each of the at least one processing machine including an electronic controller operable to execute processing programs to use the processing tools, and a robot arranged on a driverless base frame by means of which the processing tools can be supplied to and removed from the machine magazine, characterized in that the driverless base frame is an automated guided vehicle (AGV), and the arrangement comprises:
   a central tool magazine for different ones of the processing tools, the central tool magazine being arranged such that the robot of the driverless base frame can remove and transfer the processing tools directly from/to said central tool magazine and said machine magazine;
   a temporary magazine provided on said driverless base frame, separate from the robot, for accommodating a plurality of the processing tools at one time; and
   a control system for wirelessly separately controlling the driverless base frame and the robot, wherein the control system includes a first transmitter for controlling the base frame and a different second transmitter for controlling the robot,
   wherein the control system is configured to connect to said at least one processing machine to determine a next one of the processing programs to be performed by the at least one processing machine and to select one of the different ones of the processing tools in the central magazine necessary for said next one of the processing programs,
   wherein the at least one processing machine and/or the central tool magazine is provided with a respective electromechanical interface, and
   wherein the electromechanical interface connects to the robot to supply electrical power to the robot and further connects to the driverless base frame to supply compressed air for a pneumatically driven gripper of the robot.

2. The arrangement according to claim 1, characterized in that the temporary magazine of the driverless base frame is designed to accommodate at least three of the processing tools, wherein the temporary magazine is designed such that each of the at least three processing tools is accommodated therein in a positionally defined way.

3. The arrangement according to claim 2, characterized in that the temporary magazine of the driverless base frame is designed to accommodate at least ten of the processing tools.

4. The arrangement according to claim 2, wherein
   said temporary magazine includes multiple levels with one or more mechanical positioning aids at each of said multiple levels, each of the one or more mechanical positioning aids being configured to support one or more of said at least three processing tools in a defined position and alignment during movement of the driverless base frame; and
   said robot is configured and arranged to:
      directly transfer a processing tool to and from the machine magazine when the driverless base frame is adjacent said machine magazine;
      directly transfer the processing tool to and from one of said multiple levels of said temporary magazine on the driverless base frame; and
      directly transfer the processing tool to and from the central tool magazine when the driverless base frame is adjacent said central tool magazine.

5. The arrangement according to claim 4, wherein at least one of the one or more positioning aids includes horizontally extending strips at each of said multiple levels configured to support the at least three processing tools.

6. The arrangement according to claim 4, wherein:
   the driverless base frame includes base frame interface for engaging the electromechanical interface, and
   wherein the electromechanical interface and the base frame interface are configured to supply electrical power to the driverless base frame.

7. The arrangement according to claim 1, characterized in that the driverless base frame is provided with a base frame interface by means of which the driverless base frame is dockable at the electromechanical interface, wherein at the electromechanical interface, the driverless base frame is supplied with power.

8. The arrangement according to claim 1, characterized in that the driverless base frame is driven by an electric drive and is provided with at least one accumulator for power supply for the electric drive, wherein the at least one accumulator is chargeable at the electromechanical interface.

9. The arrangement according to claim 1, characterized in that the robot arranged on the driverless base frame is electrically driven, and the robot is supplied with electrical power at the electromechanical interface.

10. The arrangement according to claim 1, characterized in that the robot is designed as at least a 4-axis robot.

11. The arrangement according to claim 10, characterized in that the robot is designed as at least a 6-axis robot.

12. The arrangement according to claim 1, characterized in that the driverless base frame is provided with a compressed air reservoir for actuating the gripper or that the driverless base frame is connected to a compressed air source for actuating the gripper upon docking at the electromechanical interface.

13. The arrangement according to claim 1, characterized in that the machine magazine of the at least one processing machine is provided with a sealable loading opening via which the robot may supply and/or remove the processing tools to/from the at least one processing machine.

14. An arrangement for processing workpieces, with at least one processing machine and a machine magazine assigned to a corresponding one of the at least one processing machine for accommodating processing tools, and a robot arranged on a driverless base frame by means of which the processing tools can be supplied to and removed from the machine magazine, characterized in that the driverless base frame in automated guided vehicle (AGV), and the arrangement comprises:
- a central tool magazine for different ones of the processing tools, the central tool magazine being arranged such that the robot of the driverless base frame can remove and transfer the processing tools directly from/to said central tool magazine and said machine magazine;
- a temporary magazine provided on said driverless base frame, separate from the robot, for accommodating a plurality of the processing tools at one time; and
- a control system for wirelessly separately controlling the driverless base frame and the robot, wherein the control system includes a first transmitter for controlling the base frame and a different second transmitter for controlling the robot,
- wherein the at least one processing machine and/or the central tool magazine is provided with a respective electromechanical interface, and
- wherein the electromechanical interface connects to the robot to supply electrical power to the robot and further connects to the driverless base frame to supply compressed air for a pneumatically driven gripper of the robot.

15. The arrangement according to claim 14, further comprising means for detecting an actual position of the driverless base frame and/or the robot with respect to the at least one processing machine and/or the central tool magazine after the docking of the driverless base frame at the electromechanical interface.

* * * * *